US012392468B2

(12) United States Patent
Gromfeld et al.

(10) Patent No.: US 12,392,468 B2
(45) Date of Patent: Aug. 19, 2025

(54) LIGHT-EMITTING DEVICE FOR A MOTOR VEHICLE

(71) Applicant: VALEO VISION, Bobigny (FR)

(72) Inventors: Yves Gromfeld, Bobigny (FR); Sylvain Giraud, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/716,590

(22) PCT Filed: Dec. 6, 2022

(86) PCT No.: PCT/EP2022/084666
§ 371 (c)(1),
(2) Date: Jun. 5, 2024

(87) PCT Pub. No.: WO2023/104833
PCT Pub. Date: Jun. 15, 2023

(65) Prior Publication Data

US 2025/0035282 A1 Jan. 30, 2025

(30) Foreign Application Priority Data

Dec. 7, 2021 (FR) ...................................... 2113068

(51) Int. Cl.
*F21S 41/365* (2018.01)
*F21S 41/25* (2018.01)
(Continued)

(52) U.S. Cl.
CPC ............. *F21S 41/365* (2018.01); *F21S 41/25* (2018.01); *F21S 41/321* (2018.01); *F21S 41/39* (2018.01); *F21W 2102/135* (2018.01)

(58) Field of Classification Search
CPC ................................ F21S 41/365; F21S 41/25
See application file for complete search history.

(56) References Cited

U.S. PATENT DOCUMENTS

| | | | |
|---|---|---|---|
| 7,347,600 | B2 | 3/2008 | Albou |
| 9,134,000 | B2 | 9/2015 | de Lamberterie et al. |
| 10,920,949 | B2 | 2/2021 | Giraud |

FOREIGN PATENT DOCUMENTS

| | | | |
|---|---|---|---|
| CN | 210740277 | U | 6/2020 |
| DE | 102010023600 | A1 | 12/2011 |

(Continued)

OTHER PUBLICATIONS

European Patent Office, International Search Report (with English translation) and Written Opinion of corresponding International Application No. PCT/EP2022/084666, dated Feb. 7, 2023.

*Primary Examiner* — Robert J May
(74) *Attorney, Agent, or Firm* — Valeo Vision

(57) ABSTRACT

The invention relates to a light-emitting device for a motor vehicle. The device includes a first module including a first light source and a first collector for reflecting the emitted light in the form of a first beam, and a first mirror for forming a first virtual image of the first collector. The device also includes a second module including a second light source and a second collector for reflecting emitted light in the form of a second beam, and a second mirror for forming a second virtual image, the second virtual image being contiguous with the first virtual image. The device further includes a projecting optical system arranged to form, on the road, an image of each of the virtual images.

12 Claims, 4 Drawing Sheets

(51) Int. Cl.

| | |
|---|---|
| ***F21S 41/32*** | (2018.01) |
| ***F21S 41/39*** | (2018.01) |
| *F21W 102/135* | (2018.01) |

(56) References Cited

FOREIGN PATENT DOCUMENTS

| | | | | |
|---|---|---|---|---|
| DE | 102014113700 | A1 * | 3/2016 | ............... B60Q 1/14 |
| EP | 1528312 | A1 | 5/2005 | |
| EP | 2708798 | A1 | 3/2014 | |
| EP | 2730838 | A1 | 5/2014 | |
| EP | 3708905 | A1 | 9/2020 | |
| JP | 2010118274 | A | 5/2010 | |
| JP | 2011233305 | A | 11/2011 | |
| WO | 2013138834 | A1 | 9/2013 | |

* cited by examiner

LIGHT-EMITTING DEVICE FOR A MOTOR VEHICLE

TECHNICAL FIELD

The invention relates to the technical field of lighting and light signaling, more specifically in the field of automotive vehicles.

The subject matter of the invention is a luminous device for an automotive vehicle.

BACKGROUND OF THE INVENTION

In the field of automotive lighting, "dual-function" luminous devices of automotive vehicles are known that are capable of selectively projecting a light beam producing low beam type and/or high beam type lighting.

Luminous devices are notably known that comprise two collectors, a shield with a front edge and two light sources, each associated with an electronic board and mounted facing each of the collectors. An optical projection system formed by a projection lens is also arranged downstream of the shield, while being focused on the front edge of the shield. Each electronic board is mounted on either side of the shield, with the front edge of the shield allowing a cut-off to be formed in the light beam emitted by one of the light sources and reflected by one of the collectors before it is projected by the lens. A disadvantage of this type of device is that the shield results in the loss of a portion of the light beams, thus resulting in a degradation of the optical performance capabilities of said luminous device. In addition, the presence of this shield and of two electronic boards increases the complexity involved in producing the luminous device and its cost.

In order to overcome the disadvantages of this type of dual-function device, luminous devices are also known comprising two juxtaposed collectors associated with an optical projection system comprising as many distinct segments as collectors, with each distinct segment being able to be formed by a lens. Each segment of the optical projection system thus directly images one of the collectors, the shape of which thus allows the profile of the light beam projected by this optical projection system to be defined. Each of the segments of the optical projection system is therefore involved in producing either lighting of the low beam type or lighting of the high beam type. Thus, when the luminous device is turned on in order to perform a low beam type lighting function, only a portion of the segments of the optical projection system is turned on, so that the overall appearance of the optical projection system is inhomogeneous. In addition, the more the optical projection system is segmented, the more unsightly it is when the luminous device is turned off.

The invention therefore falls within this context and seeks to overcome all the aforementioned disadvantages. Thus, the invention seeks to propose a luminous device of the dual-function type that is able to produce, through the same optical projection system, a low beam type lighting function and a high beam type lighting function, the performance capabilities and the cost of which are optimal and the optical projection system of which appears to be hardly segmented or non-segmented when turned off and appears to be generally homogeneous when turned on, irrespective of the lighting function performed by the luminous device.

SUMMARY OF THE INVENTION

The subject matter of the invention is a luminous device of an automotive vehicle comprising a first luminous module comprising a first light source and a first collector comprising a reflective surface arranged to collect and reflect light emitted by said first light source in the form of a first light beam, said first luminous module comprising a first mirror arranged to form a first virtual image of the reflective surface of the first collector; a second luminous module comprising a second light source and a second collector comprising a reflective surface arranged to collect and reflect light emitted by said second light source in the form of a second light beam, said second luminous module comprising a second mirror arranged to form a second virtual image of the reflective surface of the second collector, the second virtual image being contiguous with or partially superposing the first virtual image; an optical projection system associated with the first luminous module and the second luminous module, said optical projection system being arranged to project the first and second light beams, said optical projection system being arranged to form an image on the road of each of the virtual images formed by the first and second mirrors.

The first light beam projected by the optical projection system can, for example, participate in the formation of a lighting function of the regulatory low beam type. The second light beam projected by the optical projection system can, for example, participate in the formation of a lighting function of the regulatory high beam type. For example, the second projected light beam can send light above the upper cut-off defined for a beam of the regulatory low beam type. In this case, the first beam projected by the optical projection system sends light below the upper cut-off defined by the regulations for a beam of the regulatory low beam type, while the second beam projected by the optical projection system will supplement the first projected beam by sending light above this upper cut-off defined for a lighting function of the regulatory low beam type. The luminous device is then a luminous device of the dual-function type.

The first luminous module comprises a first light source, a first mirror and a first collector comprising a reflective surface. The first collector can be disposed in line with the first light source, so as to collect the first light beam produced by the first light source and send it toward the first mirror. The first mirror can be arranged to form a first virtual image of the reflective surface of the first collector and to return the virtual image of said first collector to the optical projection system, which itself is adapted to project the first light beam onto the road.

The second luminous module comprises a second light source, a second mirror and a second collector comprising a reflective surface. The second collector can be disposed in line with the second light source, so as to collect the second light beam produced by the second light source and send it toward the second mirror. The second mirror can be arranged to form a second virtual image of the reflective surface of the second collector and to return the virtual image of said second collector to the optical projection system, which itself is adapted to project the second light beam onto the road.

The optical projection system can be arranged at the front of the device and be common to the first and second luminous modules. The optical projection system can comprise an entrance surface common to the first light beam reflected by the first mirror and a second light beam reflected by the second mirror.

The first virtual image and the second virtual image can be disposed behind the first collector and the second collector.

The first and second collectors can be disposed such that the first virtual image and the second virtual image are contiguous or are partially superposed. Thus, this arrangement of the first and second virtual images can allow the rear edges of the first and second collectors to be continuously projected onto the road.

In one embodiment, the device comprises a third luminous module comprising a third light source and a third collector comprising a reflective surface arranged to collect and reflect light emitted by said third light source in the form of a third light beam, said third luminous module comprising a third mirror arranged to form a third virtual image of the reflective surface of the third collector; a fourth luminous module comprising a fourth light source and a fourth collector comprising a reflective surface arranged to collect and reflect light emitted by said fourth light source in the form of a fourth light beam, said fourth luminous module comprising a fourth mirror arranged to form a fourth virtual image of the reflective surface of the fourth collector, the fourth virtual image being contiguous with or partially superposing the third virtual image; the optical projection system being associated with the third luminous module and the fourth luminous module, said optical projection system being arranged to project the third and fourth light beams, said optical projection system being arranged to form an image on the road of each of the virtual images formed by the third and fourth mirrors. The entrance surface of the optical projection system is then common to the third light beam reflected by the third mirror and to the fourth light beam reflected by the fourth mirror.

In one embodiment of the invention, the optical projection system is formed by a single optical part having distinct portions. For example, the optical part comprises a first portion associated with the first and second luminous modules, and a second portion associated with the third and fourth luminous modules. Each portion of the optical part can comprise a focal zone. If applicable, the focal zone of the first portion is different from the focal zone of the second portion.

In one embodiment, the optical projection system comprises one or more mirrors. In another embodiment, the optical projection system comprises one or more lenses. The optical projection system then can be formed by an optical part comprising a plurality of lenses, with each lens forming a portion of the optical part. The optical projection system can then comprise a first lens, associated with the first and second luminous modules, and a second lens, associated with the third and fourth luminous modules. If applicable, the optical part can have a segmented entrance surface, with a first segment of this entrance surface corresponding to the first lens associated with the first and second modules and a second segment of this segmented surface corresponding to the second lens associated with the third and fourth modules. The first and second mirrors are then arranged to reflect light originating from the first and second collectors toward the first segment of the optical part and the third and fourth mirrors are arranged to reflect light originating from the third and fourth collectors toward the second segment of the optical part. For example, said first and second segments can be juxtaposed laterally to each other, with each of the segments being vertically continuous.

It is understood that the optical projection system can also comprise a combination of one or more lenses with one or more mirrors.

Advantageously, the optical part, and more specifically said first lens and said second lens, can be arranged in order to superpose, on the road, the image of the third virtual image formed by the second lens corresponding to the second segment on the image of the first virtual image formed by the first lens corresponding to the first segment. For example, in the case whereby the first and third light beams each have an upper cut-off, said first and second lenses can be arranged such that these upper cut-offs of the first beam and of the third beam are substantially superposed, either partially or totally.

If applicable, the optical part, and more specifically the first lens and the second lens, can be arranged in order to superpose, on the road, the image of the fourth virtual image formed by the second lens corresponding to the second segment on the image of the second virtual image formed by the first lens corresponding to the first segment.

If desired, the device can comprise at least one partition wall arranged, notably vertically, between the entrance surface of the optical projection system and the first, second, third and fourth luminous modules, with said wall being arranged to block light reflected by the mirror of one of the first and second luminous modules, respectively of one of the third and fourth luminous modules, toward the second segment, respectively toward the first segment.

In one embodiment, the first collector and the third collector can form a single part, associated with the first light source and with the third light source. If applicable, the second collector and the fourth collector can form a single part, distinct from the single part formed by the first and third collectors, and associated with the second light source and with the fourth light source. As an alternative embodiment, the set of first, second, third and fourth collectors can form a single part.

Advantageously, the first mirror and the third mirror can form a single part, for example, distinct from the single part formed by the first and third collectors. If applicable, the second and fourth mirrors can form a single part, distinct from the single part formed by the first and third mirrors. As an alternative embodiment, the set of first, second, third and fourth mirrors can form a single part.

As an alternative embodiment, the first collector and the third collector and the first mirror and the third mirror can form a single part. If applicable, the second collector and the fourth collector and the second mirror and the fourth mirror can form a single part.

In another embodiment, each collector associated with a mirror can form a single part.

In yet another embodiment, the set of first, second, third and fourth collectors and of first, second, third and fourth mirrors can form a single part.

Advantageously, the first and second mirrors are oriented so as to reflect the first and second light beams in the same given direction, and the first and second light sources are arranged so as to emit light in a direction opposite said given direction.

The first and second light beams can be oriented in the same direction, i.e., they can be oriented in the direction of the optical axis and in the direction toward the optical projection system.

The first and second light sources can be arranged so as to emit light in the direction of the optical axis and in a direction opposite that of the first and second light beams.

Advantageously, the first and second light sources are mounted on the same support, with said support comprising an opening and the first and second mirrors being oriented so that the first and second light beams are reflected toward the optical projection system through said opening.

The support on which the first and second light sources can be mounted can be an electronic board common to the two light sources. In another embodiment, the support can be in the form of two distinct electronic boards spaced apart from one another, with each of said electronic boards being adapted to support a light source. In this embodiment, there then can be as many electronic boards as light sources.

Advantageously, the first and the second mirror are mounted symmetrically to one another relative to an optical axis of the optical projection system, with each mirror being oriented at an angle ranging between 40° and 50° relative to this optical axis of said optical projection system.

The first and second mirrors are mounted on either side of the optical axis of the optical projection system. The first and second mirrors can be substantially identical.

The angle of the mirrors relative to the optical axis can range between 40° and 50°, and notably can be equal to 45°.

Advantageously, the first mirror and the second mirror are contiguous.

The first mirror and the second mirror can be contiguous so as to be able to allow the first virtual image and the second virtual image to be contiguous or partially superposed.

Advantageously, the first mirror and the second mirror are flat.

Advantageously, the first mirror and the second mirror are concave.

The concavity can allow any geometric and chromatic aberrations of the optical projection system to be corrected.

In another embodiment, the first and second mirrors can be convex.

Advantageously, the first collector has a rear edge and the second collector has a rear edge. The first mirror then forms a virtual image of the rear edge of the first collector and the second mirror then forms a virtual image of the rear edge of the second collector.

Advantageously, the optical projection system is arranged to project the first light beam reflected by the first mirror in the form of a light beam having an upper cut-off, the optical projection system is arranged such that said upper cut-off is formed by the image of the virtual image of the rear edge of the first collector formed by the optical projection system.

Advantageously, the first light beam projected by the optical projection system can assist in the formation of a lighting function of the regulatory low beam type having an upper cut-off, and the second light beam projected by the optical projection system is at least partially projected above said upper cut-off and assists in the formation of a lighting function of the regulatory high beam type. If applicable, the upper cut-off of the first beam can be formed by the image of the virtual image of the rear edge of the first collector formed by the optical projection system. The second luminous module and the optical projection system can be arranged such that said second light beam is projected at least partially above said upper cut-off.

Advantageously, the first and second mirrors are arranged so that the virtual images of the rear edges of the first and second collectors are superposed or juxtaposed.

Advantageously, the optical projection system has a focal zone located in the vicinity of a junction zone of the first and second virtual images of the rear edges of the first and second collectors.

The focal zone can be disposed on the optical axis, behind the first and second collectors. The first and second collectors and the first and second mirrors can be disposed so that the virtual images of the rear edges of the first and second collectors are superposed or juxtaposed in the vicinity of the focal zone.

Advantageously, the focal zone has a focal point disposed at the junction of the first virtual image and of the second virtual image, with said focal point being disposed behind the first collector and the second collector.

The limitations applied to the first and second luminous modules can be applied, if applicable, to the third and to the fourth luminous modules.

BRIEF DESCRIPTION OF THE DRAWINGS

Further advantages and features of the present invention will now be described using examples that are purely illustrative and by no means limit the scope of the invention, and on the basis of the appended drawings, in which the various figures show.

Throughout the following description, elements that are identical in terms of structure or function and that appear in different figures retain the same reference signs, unless otherwise specified.

DETAILED DESCRIPTION OF THE INVENTION

Figure 1:
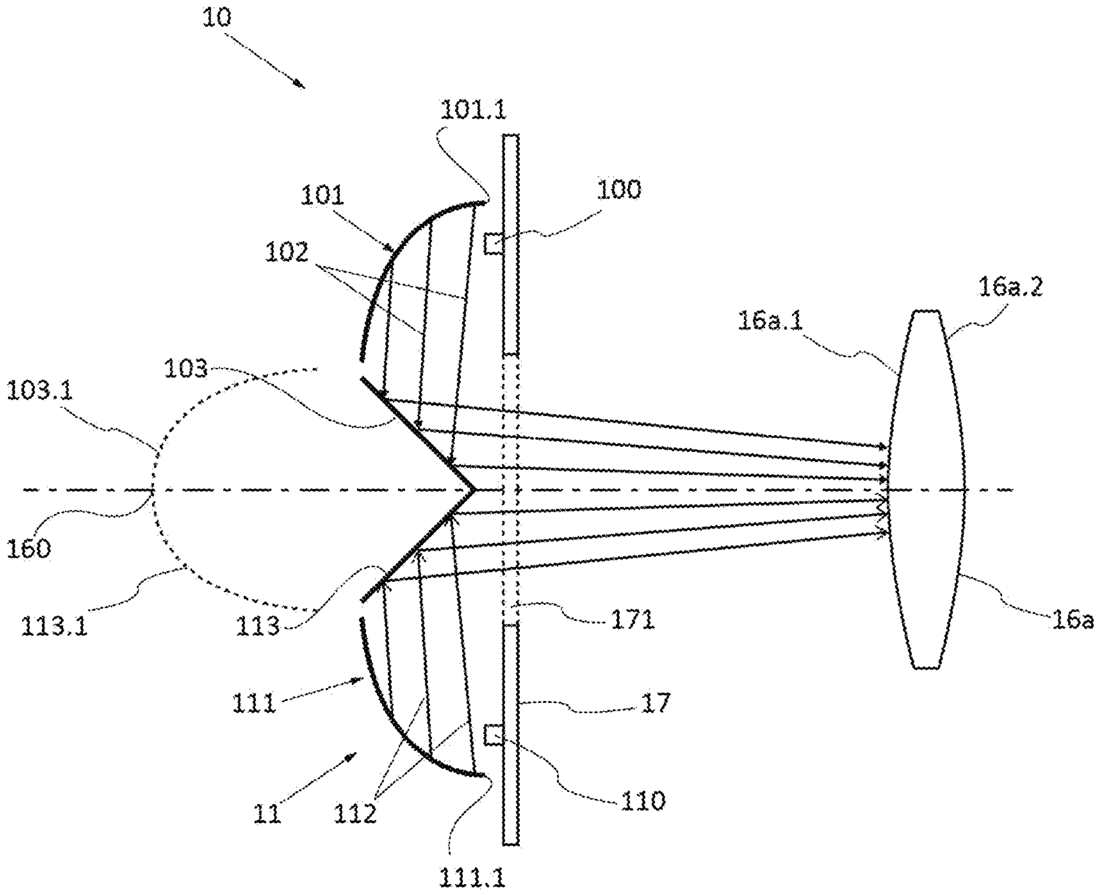
FIG. 1 schematically shows a section view of a luminous device according to one embodiment of the invention.

FIG. 1 shows a luminous device 1 of an automotive vehicle according to a particular embodiment of the invention. This luminous device 1 is described with reference to FIG. 2 and FIG. 3 describing an embodiment similar to that described in FIG. 1. FIG. 4 describes another embodiment of the invention as a section view, this figure is described with reference to FIG. 5.

FIG. 1 describes a first general embodiment of a luminous device 1 of an automotive vehicle comprising a first luminous module 10, a second luminous module 11 and an optical projection system formed by a lens 16*a*.

The first luminous module 10 comprises a first light source 100 suitable for emitting light and a first collector 101. The first collector 101 comprises a rear edge 101.1. The light reflected by the first collector 101 forms a first light beam 102. The first collector 101 comprises a reflective surface disposed in the vicinity of the first light source 100, arranged to collect and reflect the light emitted by said first light source 100.

The second luminous module 11 comprises a second light source 110 adapted to emit light and a second collector 111. The second collector 111 comprises a rear edge 111.1. The light reflected by the second collector 111 forms a second light beam 112. The second collector 111 comprises a reflective surface disposed in line with the second light source 110, arranged to collect and reflect the light emitted by said second light source 110.

The first light source 100 and the second light source 110 are mounted on the same support 17. The support 17 is an electronic board common to the first light source 100 and to the second light source 110. Said support 17 comprises an opening 171. The first light source 100 and the second light source 110 are arranged so as to emit light in the direction of an optical axis in a direction opposite the lens 16*a*. Once reflected by the reflective surface of the first collector 101 and of the second collector 111, the first light beam 102 and the second light beam 112 are directed toward the first 103 and second mirrors 113 and are then oriented toward the lens 16*a* and in the direction of the lens 16*a*.

The first luminous module 10 comprises a first mirror 103 oriented so that the first light beam 101 is reflected toward the lens 16*a* through said opening 171. The first mirror 103 is arranged to form a first virtual image 103.1 of the reflective surface of the first collector 101. The first mirror 103 is arranged to return the first virtual image 103.1 from the first collector 101 to the lens 16*a*.

The second luminous module 11 comprises a second mirror 113 oriented so that the second light beam 111 is reflected toward the lens 16*a* through said opening 171. The second mirror 113 is arranged to form a second virtual image 113.1 of the reflective surface of the second collector 111. The second mirror 113 is arranged to return the second virtual image 113.1 of the second collector 111 to the lens 16*a*.

The first virtual image 103.1 and the second virtual image 113.1 are disposed upstream of the first collector 101 and of the second collector 111.

The first mirror 103 and the second mirror 113 are oriented so as to reflect the first light beam 102 and the second light beam 112 along the optical axis, toward the lens 16*a*, through the opening 171 formed in the support 17.

The first mirror 103 and the second mirror 113 are mounted symmetrically to one another on either side of the optical axis of the lens 16*a*, with each mirror being oriented at an angle ranging between 40° and 50°, notably of 45° relative to this optical axis of said lens.

The first mirror 103 and the second mirror 113 are disposed relative to one another in a contiguous manner. Thus, the first virtual image 103.1 of the rear edge 101.1 of the first collector 101 and the second virtual image 113.1 of the rear edge 111.1 of the first collector 111 are superposed or juxtaposed.

The lens 16*a* comprises an entrance surface 16*a*.1 and an exit surface 16*a*.2. The exit surface 16*a*.2 of the lens 16*a* is common to the first light beam 102 reflected by the first mirror 103 and to the second light beam 112 reflected by the second mirror 113.

The lens 16*a* is arranged to project the first light beam 102 and the second light beam 112, so as to form an image on the road of the first virtual image 103.1 of the first collector 101 and an image of the second virtual image 113.1 of the second collector 111.

The lens 16*a* is arranged to project the rear edge 101.1 of the first collector 101 onto the road so that the first beam projected onto the road has an upper cut-off formed by the virtual image of the rear edge 101.1 of the first collector 101. The lens 16*a* is also arranged to project the rear edge 111.1 of the second collector 111 onto the road. The first virtual image 103.1 and the second virtual image 113.1 are continuously projected onto the road by the contiguous arrangement of the first mirror 103 and of the second mirror 113.

The lens 16*a* has an optical axis 161 and comprises a focal zone 160 located on the optical axis 161, behind the first collector 101 and the second collector 111. In particular, the focal zone 160 comprises a focal point disposed at the junction of the first virtual image 103.1 and of the second virtual image 113.1. The lens 16*a* is disposed at the front of the luminous device 1.

Figure 2:
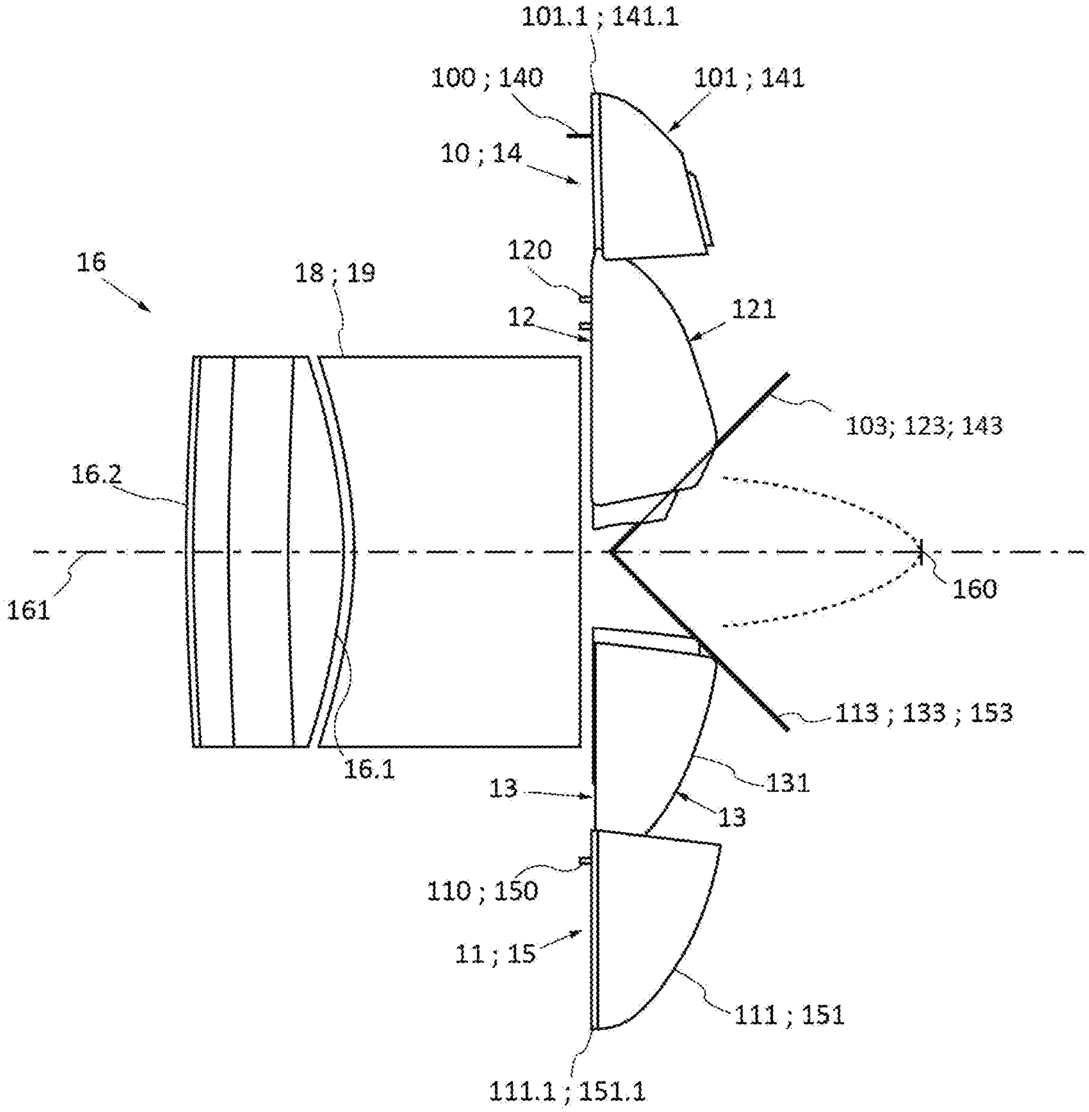
FIG. 2 schematically shows a section view of a luminous device according to one embodiment of the invention.
Figure 3:
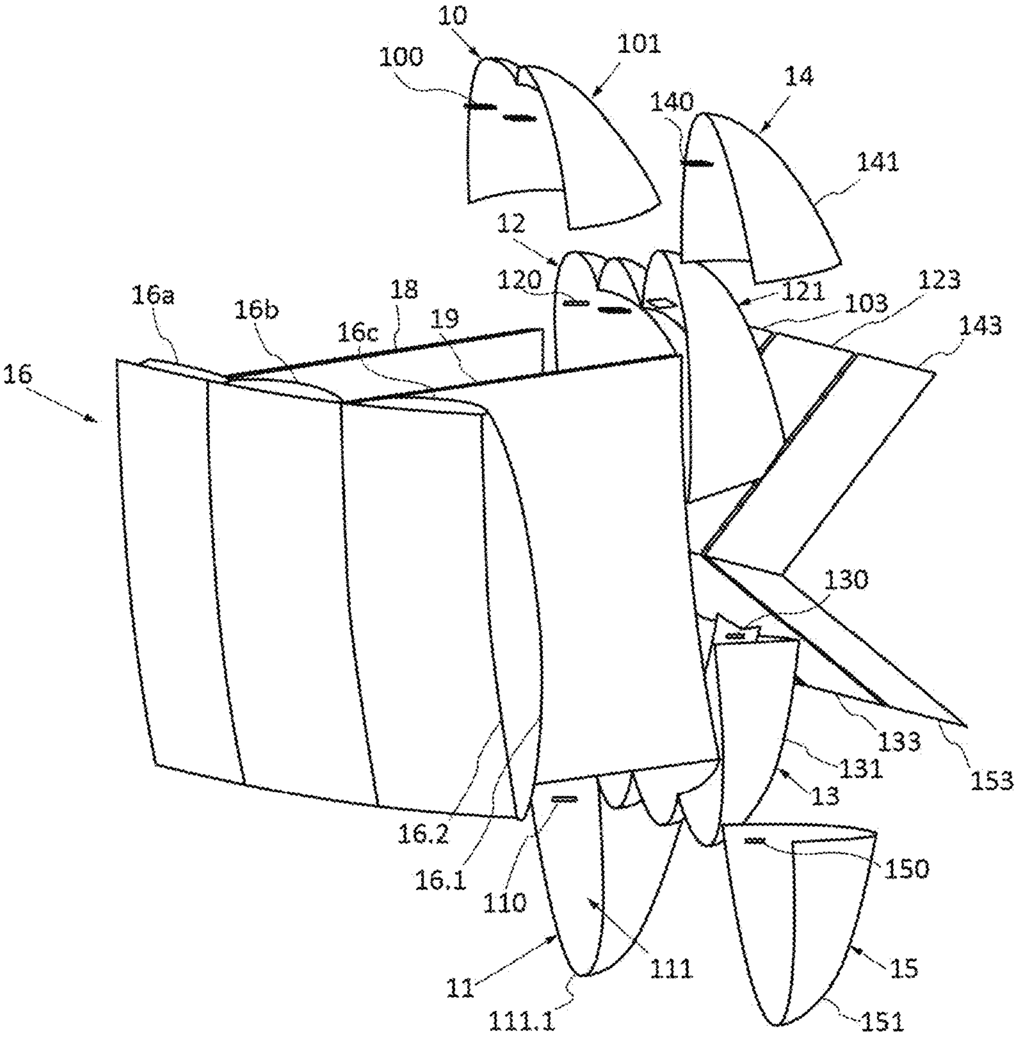
FIG. 3 schematically shows a perspective view of a luminous device according to one embodiment of the invention.
Figure 4:
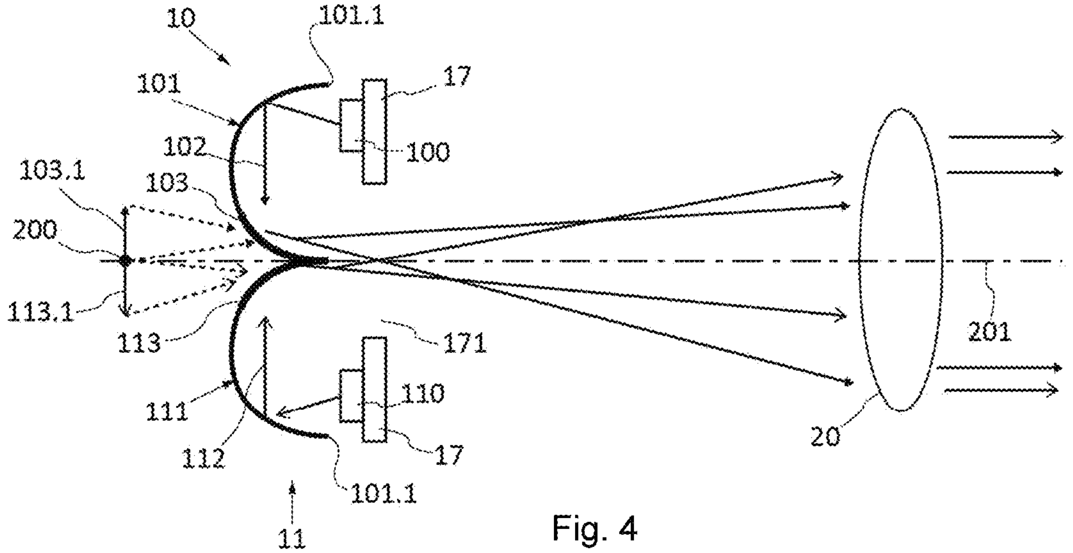
FIG. 4 schematically shows a section view of a luminous device according to another embodiment of the invention.

In the embodiment described in FIG. 2 and in FIG. 3, the luminous device 1 comprises, in addition to the first luminous module 10 and the second luminous module 11, a third luminous module 12, a fourth luminous module 13, a fifth luminous module 14 and a sixth luminous module 15.

As described with reference to FIG. 1 for the first and second luminous modules 10, 11, each of the third, fourth, fifth and sixth luminous modules 12, 13, 14, 15 respectively comprises a third, fourth, fifth and sixth light source 120, 130, 140, 150 and a third, fourth, fifth and sixth collector 121, 131, 141, 151. Each collector 121, 131, 141, 151 comprises a reflective surface arranged to collect and reflect light emitted by said light source 120, 130, 140, 150 with which it is associated in the form of a light beam.

In addition, each of the third, fourth, fifth and sixth luminous modules 12, 13, 14, 15 respectively comprises a third mirror 123, a fourth mirror 133, a fifth mirror 143 and a sixth mirror 153 arranged to respectively form a third, a fourth, a fifth and a sixth virtual image of the reflective surface, respectively, of the third, fourth, fifth and sixth collector 121, 131, 141, 151 with which it is associated.

The luminous device 1 comprises an optical projection system 16, formed by a single optical part, located at the front of the luminous device 1 and having a segmented entrance surface 16.1. Thus, the optical projection system 16 comprises a first segment formed by the lens 16*a*, called first lens 16*a*, and associated with the first 10 and second 11 luminous modules, a second segment formed by a second lens 16*b* associated with the third 12 and the fourth 13 luminous modules and a third segment formed by a third lens 16*c* associated with the fifth 14 and the sixth 15 luminous modules. Each of the first, second and third lenses 16*a*, 16*b*, 16*c* are juxtaposed in order to form a distinct portion of the single optical part or optical projection system 16.

As for the first lens 16*a*, each of the second and third lenses 16*b*, 16*c* comprises an optical axis and a focal zone that is specific thereto. The focal zone of each of the second and third lenses 16*b*, 16*c* is located on the optical axis of the corresponding lens, behind the third collector 121 and the fourth collector 131, respectively the fifth collector 141 and the sixth collector 151. In particular, the focal zone of the second lens 16*b*, respectively of the third lens 16*c*, comprises a focal point at the junction of the third virtual image and of the fourth virtual image, respectively at the junction of the fifth virtual image and of the sixth virtual image.

The first, second and third lenses 16*a*, 16*b*, 16*c* are arranged to superpose, on the road, the image of the first virtual image formed by the first lens 16*a*, the image of the third virtual image formed by the second lens 16*b* and the image of the fifth virtual image formed by the third lens 16*c*. The first, second and third lenses 16*a*, 16*b*, 16*c* are also arranged to superpose, on the road, the image of the second virtual image formed by the first lens 16*a*, the image of the fourth virtual image formed by the second lens 16*b* and the image of the sixth virtual image formed by the third lens 16*c*.

The luminous device 1 comprises a first partition wall 18 and a second partition wall 19 each arranged vertically and extending between the entrance surface 16.1 of the optical projection system 16 and each of the luminous modules 10, 11, 12, 13, 14, 15. Thus, the first beam and the second beam respectively originating from the first module 10 and from the second module 11 are separated from the third beam and the fourth beam respectively originating from the third module 12 and from the fourth module 13 by the first partition wall 18. The third beam and the fourth beam respectively originating from the third module 12 and from the fourth module 13 are separated from the fifth beam and from the sixth beam respectively originating from the fifth module 14 and from the sixth module 15 by the second partition wall 19. By virtue of the first wall 18 and the second wall 19, each of the first, second and third lenses 16*a*, 16*b*, 16*c* receives only a portion of the light beams so that each of the first, second and third lenses 16*a*, 16*b*, 16*c* projects an image onto the road of the collectors 101, 111, 121, 131, 141, 151 with which it is associated.

The first wall 18 and the second wall 19 are therefore arranged to block light reflected by the first 103 and second mirrors 113 of the first 10 and second luminous modules 11, respectively the third 123 and fourth mirrors 133 of the third 12 and fourth luminous modules 13, respectively the fifth 143 and sixth mirrors 153 of the fifth 14 and sixth luminous modules 15. Thus, the light beams directed toward the first segment 16*a* or the third segment 16*c* will not be directed toward the second segment 16*b* and, conversely, the light beams directed toward the second segment 16*b* will not be directed toward the first 16*a* or the third segment 16*c*.

It should be noted that in the embodiment that has just been described, dividing the optical projection system 16 into three lenses 16*a*, 16*b*, 16*c* allows a thin optical part to be obtained. In other words, each of the first, second and third lenses 16*a*, 16*b*, 16*c* is a thin lens. The optical aberrations introduced by each segment 16*a*, 16*b*, 16*c* of the optical projection system are thus acceptable. The mirrors 103, 113, 123, 133, 143, 153 thus can be substantially flat.

FIG. 4 describes a second general embodiment of the luminous device 1 comprising the first luminous module 10, the second luminous module 11 and an optical projection system formed by a lens 20. The first luminous module 10 and the second luminous module are similar to those described in the first embodiment.

The first luminous module 10 and the second luminous module 11 respectively comprise a first mirror 103 and a second mirror 113 arranged to respectively form a first virtual image 103.1 of the first collector 101 and a second virtual image 113.1 of the second collector 111. The first mirror 103 and the second mirror 113 are mounted symmetrically to one another on either side of the optical axis of the lens 20.

In the embodiment described in FIG. 4, the first mirror 103 and the second mirror 113 are concave, allowing the quality of the projected beam to be improved. The first mirror 103 and the second mirror 113 are contiguous so as to be able to allow the first virtual image 103.1 of the rear edge 101.1 of the first collector 101 and the second virtual image 113.1 of the rear edge 111.1 of the second collector 111 to be juxtaposed with or without any mutual overlapping.

The lens 20 comprises an entrance face 20.1 and an exit face 20.2, with each of said faces 20.1, 20.2 being common to the first light beam 102 reflected by the first mirror 103 and to the second light beam 112 reflected by the second mirror 113. The lens 20 of this embodiment is thick. This thickness thus introduces optical aberrations, which can be compensated by means of the first and second curved mirrors 103 and 113.

The lens 20 also comprises a focal zone 200 located on the optical axis 201, behind the first collector 101 and the second collector 111. The focal zone particularly comprises a focal point disposed at the junction of the first virtual image 103.1 and of the second virtual image 113.1.

Figure 5:
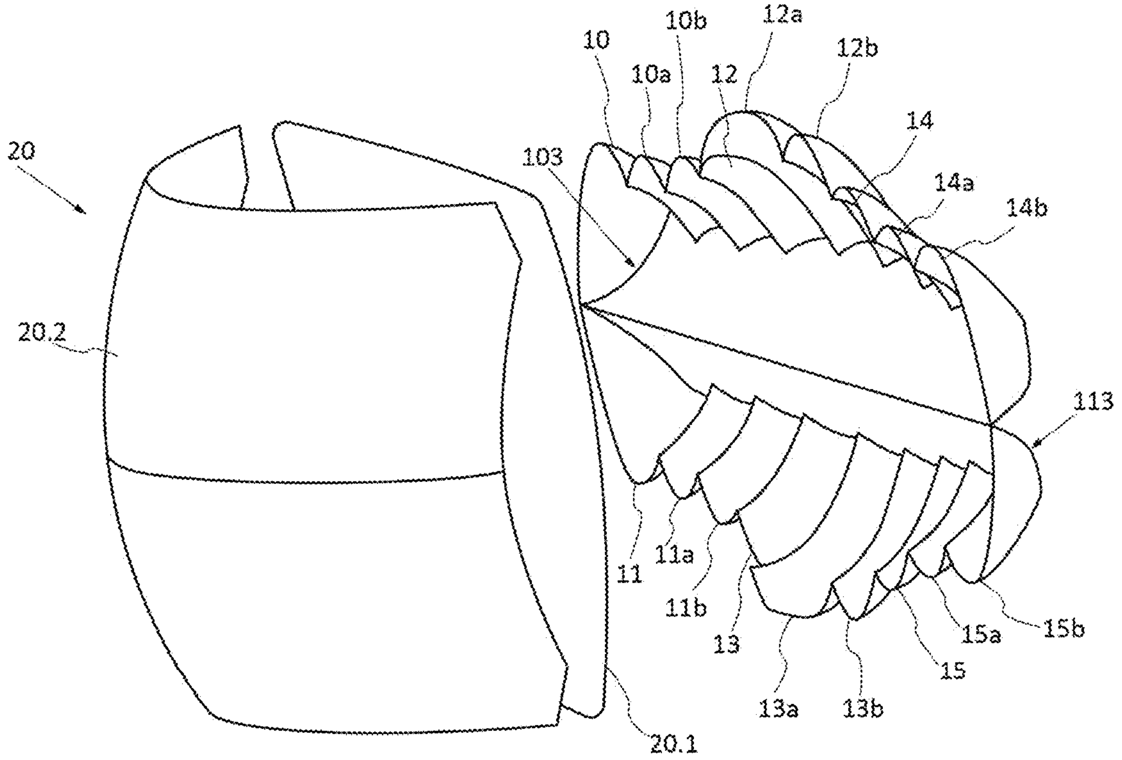
FIG. 5 schematically shows a perspective view of a luminous device according to another embodiment of the invention.

In the embodiment described in FIG. 5, the luminous device 1 comprises nine upper luminous modules 10, 10*a*, 10*b*, 12, 12*a*, 12*b*, 14, 14*a*, 14*b* and nine lower luminous modules 11, 11*a*, 11*b*, 13, 13*a*, 13*b*, 15, 15*a*, 15*b*. Each luminous module 10, 10*a*, 10*b*, 11, 11*a*, 11*b*, 12, 12*a*, 12*b*, 13, 13*a*, 13*b*, 14, 14*a*, 14*b*, 15, 15*a*, 15*b* comprises a light source and a collector. Each collector comprises a reflective surface arranged to collect and reflect light emitted by said light source in the form of a light beam. All the luminous modules are associated with the lens 20 forming the optical projection system.

The entrance surface 20.1 of the lens 20 is continuous, and common to all the eighteen beams originating from the eighteen light sources, with each of said beams produced by the upper 10, 10*a*, 10*b*, 12, 12*a*, 12*b*, 14, 14*a*, 14*b* or lower 11, 11*a*, 11*b*, 13, 13*a*, 13*b*, 15, 15*a*, 15*b* luminous modules forming a portion of a beam projected onto the road by the lens 20, with each portion being juxtaposed in order to form the projected beam.

The luminous device 1 comprises a first mirror 103 and a second mirror 113, with the first mirror 103 being common to the upper modules 10, 10*a*, 10*b*, 12, 12*a*, 12*b*, 14, 14*a*, 14*b* and the second mirror 113 being common to the lower modules 11, 11*a*, 11*b*, 13, 13*a*, 13*b*, 15, 15*a*, 15*b*. The first mirror 103 and the second mirror 113 are arranged in order to form a virtual image of the reflective surface of the collectors of the upper luminous modules 10, 10*a*, 10*b*, 12, 12*a*, 12*b*, 14, 14*a*, 14*b*, respectively of the lower luminous modules 11, 11*a*, 11*b*, 13, 13*a*, 13*b*, 15, 15*a*, 15*b* that are associated therewith.

The focal zone 200 of the lens 20 is located behind the collectors of each of the modules, and particularly comprises a focal point disposed at each of the junctions of the virtual image of a collector of an upper module and of the virtual image of a collector of a lower module aligned with the upper module.

The above description clearly explains how the invention allows its stated objectives to be achieved, namely proposing a luminous device of the dual-function type, able to produce, through the same projection lens, a lighting function of the low beam type and a lighting function of the high beam type, the performance capabilities and the cost of which are optimal and the optical projection system of which appears to be hardly segmented or non-segmented when turned off and appears to be generally homogeneous when turned on, irrespective of the lighting function performed by the luminous device. The invention seeks to achieve this objective by proposing a luminous device of an automotive vehicle comprising a first luminous module comprising a first light source and a first collector comprising a reflective surface arranged to collect and reflect light emitted by said first light source in the form of a first light beam, said first luminous module comprising a first mirror arranged to form a first virtual image of the reflective surface of the first collector; a second light module comprising a second light source and a second collector comprising a reflective surface arranged to collect and reflect light emitted by said second light source in the form of a second light beam, said second luminous module comprising a second mirror arranged to form a second virtual image of the reflective surface of the second collector, the second virtual image being contiguous with or partially superposing the first virtual image; an optical projection system associated with the first luminous module and the second luminous module, said optical projection system being arranged to project the first and second light beams, said optical projection system being arranged to form an image on the road of each of the virtual images formed by the first and second mirrors.

In any event, the invention is not limited to the embodiments specifically described in this document, and particularly extends to all equivalent means and to any technically operative combination of these means.

What is claimed is:

1. A luminous device of an automotive vehicle comprising:

a first luminous module including a first light source and a first collector with a reflective surface arranged to collect and reflect light emitted by the first light source in the form of a first light beam, and a first mirror arranged to form a first virtual image of the reflective surface of the first collector;

a second luminous module including a second light source and a second collector with a reflective surface arranged to collect and reflect light emitted by the second light source in the form of a second light beam, and a second mirror arranged to form a second virtual image of the reflective surface of the second collector, the second virtual image being contiguous with or partially superposing the first virtual image;

wherein the first collector has a rear edge and the second collector has a rear edge;

an optical projection system associated with the first luminous module and the second luminous module, the optical projection system being arranged to project the first light beam and the second light beams;

the optical projection system being arranged to form a road image on the road of each of the virtual images formed by the first and second mirrors;

wherein the first mirror and the second mirror are oriented so as to reflect the first and second light beams in a same given direction, such that the first and second light sources are ranged so as to emit light in a direction opposing the same given direction.

2. The device of claim 1, wherein the first light beam projected by the optical projection system assists in the formation of a lighting function of the regulatory low beam type having an upper cut-off, such that the second light beam projected by the optical projection system is at least partially projected above the upper cut-off facilitating in a formation of a lighting function of a regulatory high beam type.

3. The device of claim 2, wherein the first and second light sources are mounted on the same support, the support having an opening and the first and second mirrors being oriented such that the first and second light beams are reflected toward the optical projection system through the opening.

4. The device as claimed in claim 1, wherein the first and the second mirror are mounted symmetrically relative to an optical axis of the optical projection system, with each mirror being oriented at an angle ranging between 40° and 50° relative to this optical axis of the optical projection system.

5. The device as claimed in claim 1, wherein the first mirror and the second mirror are contiguous.

6. The device as claimed in claim 1, wherein the first mirror and the second mirror are flat.

7. The device as claimed in claim 1, wherein the first mirror and the second mirror are concave.

8. The device of claim 1, wherein the first and second mirrors are arranged such that the virtual images of the rear edges of the first and second collectors are superposed or juxtaposed.

9. The device of claim 8, wherein the optical projection system has a focal zone located in the vicinity of a junction zone of the first and second virtual images of the rear edges of the first and second collectors.

10. The device of claim 9, wherein the focal zone has a focal point disposed at the junction of the first virtual image and of the second virtual image, with the focal point being disposed behind the first collector and the second collector.

11. A luminous device of an automotive vehicle comprising:

a first luminous module including a first light source and a first collector with a reflective surface arranged to collect and reflect light emitted by the first light source in the form of a first light beam, and a first mirror arranged to form a first virtual image of the reflective surface of the first collector;

a second luminous module including a second light source and a second collector with a second reflective surface arranged to collect and reflect light emitted by the second light source in the form of a second light beam, and a second mirror arranged to form a second virtual image of the second reflective surface of the second collector, the second virtual image being contiguous with or partially superposing the first virtual image;

an optical projection system associated with the first luminous module and the second luminous module, the optical projection system being arranged to project the first light beam and the second light beam;

the optical projection system being arranged to form a road image of each of the virtual images formed by the first and second mirrors;

wherein the optical projection system is arranged to project the first light beam reflected by the first mirror into a light beam having an upper cut-off;

the optical projection system being arranged such that the upper cut-off is formed by an image of the virtual image of a rear edge of the first collector formed by the optical projection system.

12. A luminous device of an automotive vehicle comprising:

a first luminous module including a first light source and a first collector with a reflective surface arranged to collect and reflect light emitted by the first light source in the form of a first light beam, and a first mirror arranged to form a first virtual image of the reflective surface of the first collector;

a second luminous module including a second light source and a second collector with a reflective surface arranged to collect and reflect light emitted by the second light source in the form of a second light beam, and a second mirror arranged to form a second virtual image of the reflective surface of the second collector, the second virtual image being contiguous with or partially superposing the first virtual image;

an optical projection system associated with the first luminous module and the second luminous module, the optical projection system being arranged to project the first light beam and the second light beam;

the optical projection system being arranged to form an image on the road of each of the virtual images formed by the first and second mirrors;

wherein the first mirror and the second mirror are oriented so as to reflect the first and second light beams in a same given direction, such that the first and second light sources are arranged so as to emit light in a direction opposing the same given direction.

* * * * *